US012617595B2

(12) United States Patent
Ahumada

(10) Patent No.: US 12,617,595 B2
(45) Date of Patent: May 5, 2026

(54) SLEEVE FOR HOLDING CONTAINERS

(71) Applicant: Graphic Packaging International, LLC, Atlanta, GA (US)

(72) Inventor: Johanna Ahumada, Oak Park, IL (US)

(73) Assignee: Graphic Packaging International, LLC, Atlanta, GA (US)

( * ) Notice: Subject to any disclaimer, the term of this patent is extended or adjusted under 35 U.S.C. 154(b) by 108 days.

(21) Appl. No.: 18/409,882

(22) Filed: Jan. 11, 2024

(65) Prior Publication Data

US 2024/0239580 A1 Jul. 18, 2024

Related U.S. Application Data

(60) Provisional application No. 63/438,674, filed on Jan. 12, 2023.

(51) Int. Cl.
*B65D 65/22* (2006.01)
*B31B 50/26* (2017.01)
(Continued)

(52) U.S. Cl.
CPC ............ *B65D 71/243* (2013.01); *B31B 50/26* (2017.08); *B31B 2100/00* (2017.08);
(Continued)

(58) Field of Classification Search
CPC ........ B65D 71/06; B65D 71/12; B65D 71/14; B65D 71/16; B65D 71/18; B65D 71/24;
(Continued)

(56) References Cited

U.S. PATENT DOCUMENTS 2,964,229 A * 12/1960 Mansfield .............. B65D 71/14 206/499
3,424,301 A * 1/1969 Forrer .................... B65D 71/16 206/149
(Continued)

FOREIGN PATENT DOCUMENTS

FR 1383034 A * 12/1964 ............ B65D 71/32
JP 2015-058945 A 3/2015
(Continued)

OTHER PUBLICATIONS

Nosaka (Year: 2020).*
International Search Report and Written Opinion for PCT/US2024/011134 dated May 21, 2024.

*Primary Examiner* — Nathan J Newhouse
*Assistant Examiner* — Nina K Attel
(74) *Attorney, Agent, or Firm* — Andrew N. Claerbout; FisherBroyles, LLP

(57) ABSTRACT

A construct for at least partially receiving one or more product holding containers. The construct can comprise a plurality of panels extending at least partially around an interior of the construct. The plurality of panels can have at least a first configuration for at least partially receiving a first container in the interior and a second configuration for at least partially receiving a second container in the interior. The first container can have a first size and the second container can have a second size that is different than the first size. The construct further can comprise an adjustment feature in at least a panel of the plurality of panels. The adjustment feature can be at least partially coplanar with a remainder of the panel in the first configuration and can be nonparallel with the remainder of the panel in the second configuration.

37 Claims, 8 Drawing Sheets

(51) Int. Cl.

| | |
|---|---|
| ***B65D 71/12*** | (2006.01) |
| ***B65D 71/24*** | (2006.01) |
| *B31B 100/00* | (2017.01) |

(52) U.S. Cl.

CPC .............. *B65D 2571/00141* (2013.01); *B65D 2571/0037* (2013.01); *B65D 2571/0066* (2013.01); *B65D 2571/00716* (2013.01); *B65D 2571/00913* (2013.01)

(58) Field of Classification Search

CPC .. B65D 71/243; B65D 5/0005; B65D 77/003; B65D 77/0433; B65D 2571/00716; B65D 2571/0066; B65D 2571/00246; B65D 2571/00253; B65D 2571/00259; B65D 2571/00271; B65D 2571/0037; B65D 2571/00888; B65D 2571/00895; B65D 2571/00913; B65D 2571/00925

USPC ........ 229/103.2, 101, 87.01, 87.08; 206/434, 206/485, 485.1, 784, 87.01, 87.08, 103.2

See application file for complete search history.

(56) References Cited

U.S. PATENT DOCUMENTS

| | | | | | |
|---|---|---|---|---|---|
| 3,912,157 | A * | 10/1975 | Graser | .................... | B65D 71/18 229/126 |
| 6,568,585 | B2 * | 5/2003 | Marie | .................... | B65D 71/16 206/427 |
| 2020/0339330 | A1 | 10/2020 | Buscema et al. | | |
| 2021/0130039 | A1 | 5/2021 | Forest | | |
| 2021/0394985 | A1 * | 12/2021 | Furio | .................... | B65D 75/14 |

FOREIGN PATENT DOCUMENTS

| | | | |
|---|---|---|---|
| JP | 2020-142821 | A | 9/2020 |
| KR | 10-2015-0109184 | A | 10/2015 |

* cited by examiner

SLEEVE FOR HOLDING CONTAINERS

CROSS-REFERENCED TO RELATED APPLICATIONS

This application claims the benefit of U.S. Provisional Patent Application No. 63/438,674, filed on Jan. 12, 2023.

INCORPORATION BY REFERENCE

The disclosure of U.S. Provisional Patent Application No. 63/438,674, which was filed on Jan. 12, 2023, is hereby incorporated by reference for all purposes as if presented herein in its entirety.

BACKGROUND OF THE DISCLOSURE

The present disclosure generally relates to constructs, sleeves, carriers, and/or cartons for holding containers or other types of articles. More specifically, the present disclosure relates to a construct for holding a plurality of containers such as product holding containers, the construct having features to facilitate adjustment of at least a portion of the construct for accommodating product holding containers selected from two or more different sizes.

SUMMARY OF THE DISCLOSURE

In general, one aspect of the disclosure is directed to a construct for at least partially receiving one or more product holding containers. The construct can comprise a plurality of panels extending at least partially around an interior of the construct. The plurality of panels can have at least a first configuration for at least partially receiving a first container in the interior and a second configuration for at least partially receiving a second container in the interior. The first container can have a first size and the second container can have a second size that is different than the first size. The construct further can comprise an adjustment feature in at least a panel of the plurality of panels. The adjustment feature can be at least partially coplanar with a remainder of the panel in the first configuration and can be nonparallel with the remainder of the panel in the second configuration.

In another aspect, the disclosure is generally directed to a package comprising a construct at least partially receiving one or more product holding containers. The construct can comprise a plurality of panels extending at least partially around an interior of the construct and an adjustment feature in at least a panel of the plurality of panels. The plurality of panels can have at least a first configuration in which the adjustment feature is at least partially coplanar with a remainder of the panel and a second configuration in which the adjustment feature is nonparallel with the remainder of the panel. A first container can be at least partially received in the interior of the construct when the plurality of panels is in the first configuration and a second container can be at least partially received in the interior of the construct when the plurality of panels is in the second configuration. The first container can have a first size and the second container can have a second size that is different than the first size.

In another aspect, the disclosure is generally directed to a blank for forming a construct for at least partially receiving one or more product holding containers. The blank can comprise a plurality of panels. The plurality of panels can have at least a first configuration for at least partially receiving a first container in an interior of the construct formed from the blank and a second configuration for receiving a second container in the interior of the construct formed from the blank. The first container can have a first size and the second container can have a second size that is different than the first size. The blank further can comprise an adjustment feature in at least a panel of the plurality of panels. When the construct is formed from the blank, the adjustment feature can be for being at least partially coplanar with a remainder of the panel in the first configuration and can be for being nonparallel with the remainder of the panel in the second configuration.

In another aspect, the disclosure is generally directed to a method of forming a construct. The method can comprise obtaining a blank comprising a plurality of panels and an adjustment feature in at least a panel of the plurality of panels. The method further can comprise forming the construct by folding the plurality of panels to extend at least partially around an interior of the construct. The plurality of panels can have at least a first configuration for at least partially receiving a first container in the interior and a second configuration for at least partially receiving a second container in the interior. The first container can have a first size and the second container can have a second size that is different than the first size. The adjustment feature is at least partially coplanar with a remainder of the panel in the first configuration and is nonparallel with the remainder of the panel in the second configuration.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to constructs, sleeves, cartons, carriers, clips, or the like, and packages for holding articles such as containers, trays, cartons, constructs, sleeves, etc. that hold a product. The containers can be product holding containers used for packaging food and/or beverage products and/or other consumer products, or any other suitable product. The product holding containers can be made from materials suitable in composition for packaging the particular product or item, and the materials include, but are not limited to, paperboard, composite paperboard, and the like; wood; glass or other breakable material; steel, aluminum, and/or other metals; plastics such as PET, LDPE, LLDPE, HDPE, PP, PS, PVC, EVOH, and Nylon, or any combination thereof, or any other suitable material.

Constructs according to the present disclosure can accommodate articles of any shape. For the purpose of illustration and not for the purpose of limiting the scope of the disclosure, the following detailed description describes product holding containers (e.g., trays such as for holding and/or for heating food products such as frozen food products or other suitable products) as associated with the construct embodiments and/or as disposed within the construct embodiments. In this specification, the terms “inner,” “interior,” “outer,” “exterior,” “lower,” “bottom,” “upper,” and “top” indicate orientations determined in relation to fully erected and upright constructs and cartons. As described herein, constructs/sleeves can be formed from blanks by being glued with multiple panels, portions, tabs, and/or flaps, which may be designated herein in terms relative to one another, e.g., “first”, “second”, “third”, etc., in sequential or nonsequential reference, without departing from the disclosure.

Figure 1:
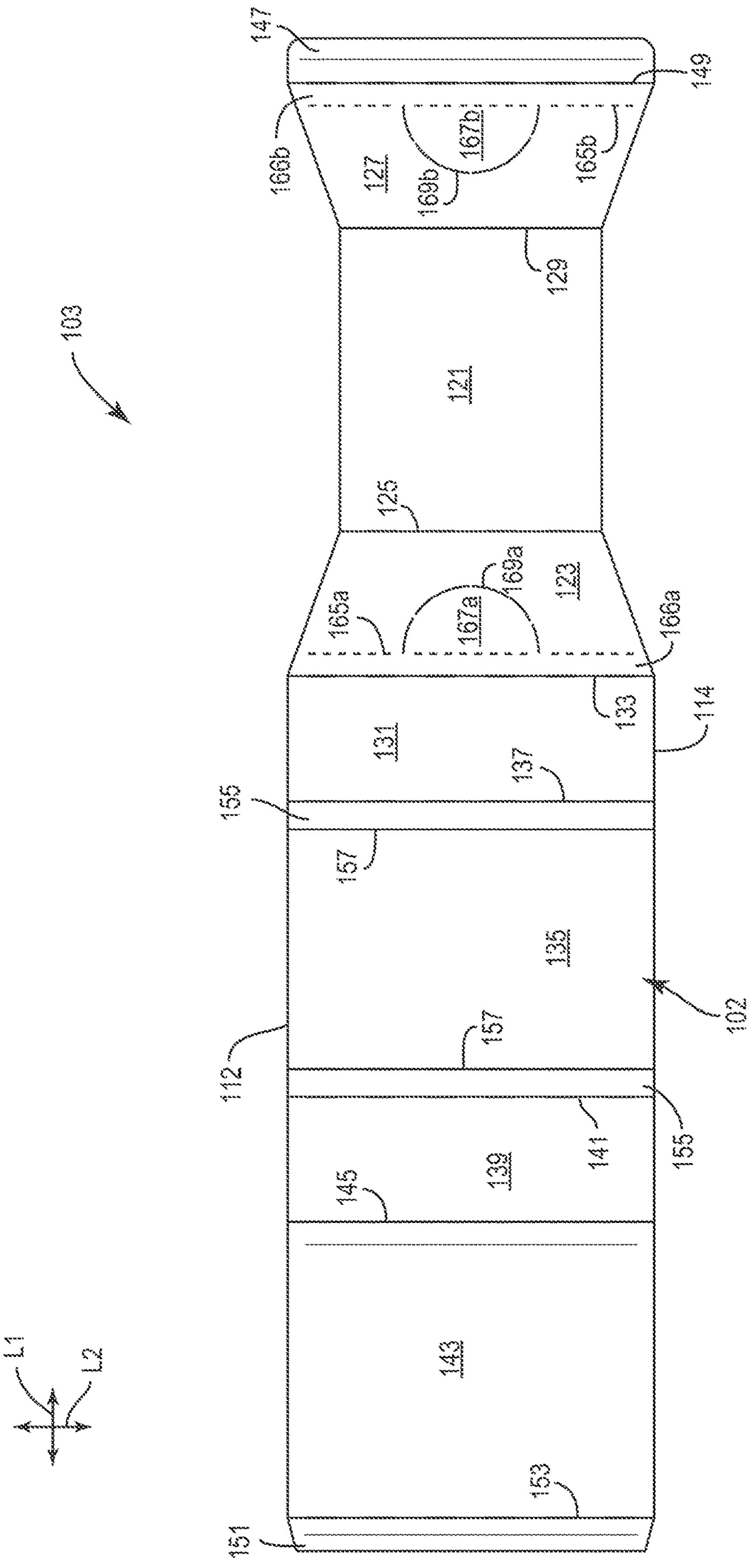
FIG. 1 is an exterior plan view of a construct blank used to form a construct or sleeve according to exemplary embodiments of the disclosure.

FIG. 1 is a plan view of an exterior surface 102 of a blank 103 used to form a construct 105 (e.g., a carrier or sleeve) (FIGS. 3-6) according to an exemplary embodiment of the disclosure. The sleeve 105 can be used to hold a plurality of product holding containers C (e.g., trays or other suitable containers) securely for shipping, storage, display, etc. In embodiments, the sleeve 105 and the containers C can cooperate to form a package 106, such as with two containers C held in the sleeve 105. Alternatively, any suitable number of containers C could be held in the sleeve. In the illustrated embodiments, the sleeve 105 has features for selectively accommodating containers C having different sizes (e.g., two different sizes or any suitable number of different sizes). For example, the containers can include a first container C1 (FIGS. 4A-6) having a first (e.g., larger) size and a second container C2 (FIG. 6) having a second (e.g., smaller) size, and the adjustment features of the sleeve 105 can facilitate reconfiguration of at least a portion of the sleeve 105 to accommodate a selected one of the containers C1, C2.

In the illustrated embodiments, the containers C1, C2 can be trays having a sidewall S and a bottom B extending around a container interior. In embodiments, the sidewall S can include a plurality of panels and end flaps, and the tray can include an open top. In other embodiments, the tray can have other suitable features, such as a lid or an otherwise closed top, a flange, etc. A food product or other suitable item (not shown) can be held in the container interior. In some embodiments, one or more of the containers C1, C2 can have a lid or closure (not shown) and/or can be at least partially enclosed in a sealed overwrap or other sealing feature (not shown). In the illustrated embodiments, the container C1 can be larger (e.g., have a higher volume) than the container C2, so that the container C1 is taller, wider, and/or longer than the container C2, for example. Alternatively shaped, sized, and/or configured containers C1, C2 may be held in the sleeve 105 without departing from the disclosure.

The blank 103 has a longitudinal axis L1 and a lateral axis L2 and a first longitudinal edge 112 and a second longitudinal edge 114. In the illustrated embodiment, the blank 103 has a top panel 121 foldably connected to a first upper side panel 123 along a first lateral fold line 125, and a second upper side panel 127 foldably connected to the top panel 121 along a second lateral fold line 129. As shown in FIG. 1, the blank 103 further can include a first lower side panel 131 foldably connected to the first upper side panel 123 along a lateral fold line 133, a bottom panel 135 foldably connected to the first lower side panel 131 along a lateral fold line 137, a second lower side panel 139 foldably connected to the bottom panel 135 along a lateral fold line 141, and a divider panel 143 foldably connected to the second lower side panel 139 along a lateral fold line 145. In embodiments, a first attachment flap 147 can be foldably connected to the second upper side panel 127 along a lateral fold line 149 and a second attachment flap 151 can be foldably connected to the divider panel 143 along a lateral fold line 153.

As shown in FIG. 1, the bottom panel 135 can include bevel portions or bevel panels 155 extending along the respective lower side panels 131, 139, wherein the bevel panels 155 can extend between the respective lateral fold lines 137, 141 and respective lateral fold lines 157 extending in the bottom panel 135. In the illustrated embodiments, the top panel 121 generally can be narrower than the bottom panel 135 (e.g., in the lateral direction L2 so that the edges 112, 114 are closer together along the top panel 121 than along other portions of the blank 103, such as the lower side panels 131, 139, the bottom panel 135, the divider panel 143, and the first attachment flap 147), and the upper side panels 123, 127 can be tapered (e.g., along oblique edge portions of the longitudinal edges 112, 114 of the blank 103) between the narrower top panel 121 and the wider portions of the blank 103.

In embodiments, the blank 103 can include adjustment features for facilitating reconfiguring the sleeve 105 between a first configuration 161 (e.g., FIGS. 3A-4C) and a second configuration 163 (e.g., FIGS. 5 and 6), as described in more detail below. As shown in FIG. 1, the adjustment features can include lateral adjustment fold lines **165*a*, 165*b* in the respective upper side panels 123, 127 (e.g., so that the lateral fold lines 165*a*, 165*b* are spaced from the respective lateral fold lines 133, 149 by a distance corresponding to a difference in width between the containers C1, C2). In embodiments, an adjustment section or portion 166*a*, 166*b* of the respective upper side panels 123, 127 can be at least partially defined between the respective lateral fold lines 133, 149 and the respective adjustment fold lines 165*a*, 165*b*. In addition, the adjustment features can include tabs 167*a*, 167*b* extending in the respective upper side panels 123, 127. In embodiments, the tabs 167*a*, 167*b* can be foldably connected to the respective upper side panels 123, 127 along the respective adjustment fold lines 165*a*, 165*b* and can be at least partially separable from the respective upper side panels 123, 127 along respective cut or tear lines 169*a*, 169*b* (e.g., cut lines interrupted by nicks). As shown in FIG. 1, the tabs 167*a*, 167*b* can extend from the respective adjustment portions 166*a*, 166*b* of the respective upper side panels 123, 127**.

The blank 103 could be otherwise shaped, arranged, and/or configured without departing from the disclosure. For example, the adjustment fold lines **165*a*, 165*b* can be interrupted by the tabs 167*a*, 167*b* (e.g., can be omitted along the tabs 167*a*, 167*b*) so that the tabs 167*a*, 167*b* extend from the respective adjustment portions 166*a*, 166*b*** without a fold line therebetween.

Figure 2B:
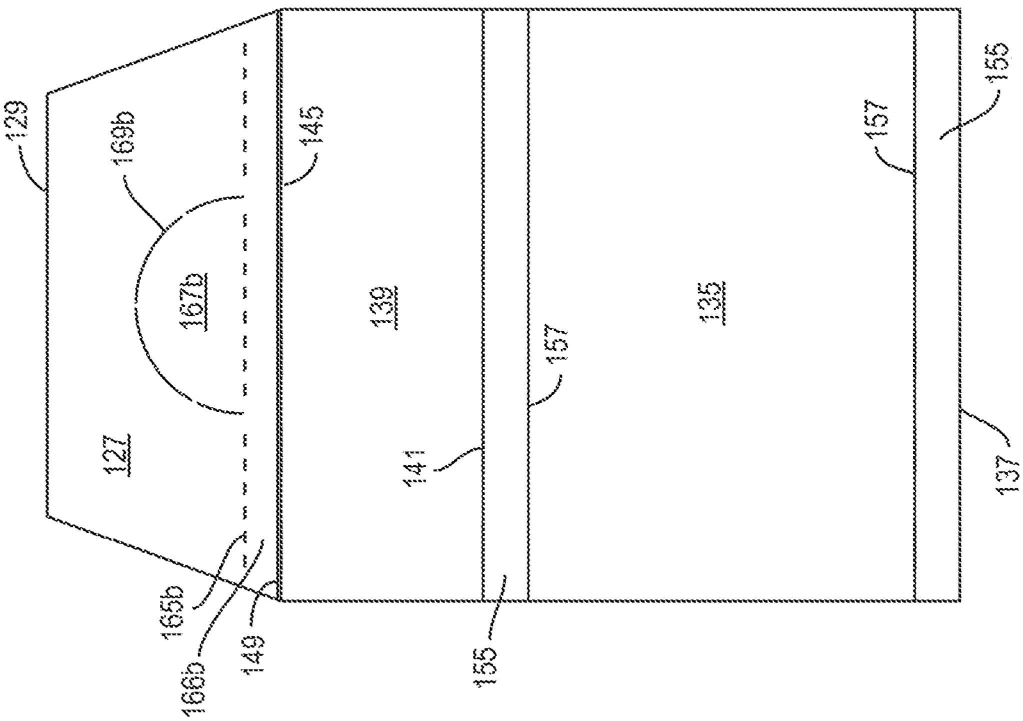
FIGS. 2A and 2B are views of the sleeve formed from the blank of FIG. 1 with the sleeve in a flattened configuration according to exemplary embodiments of the disclosure.
Figure 2A:
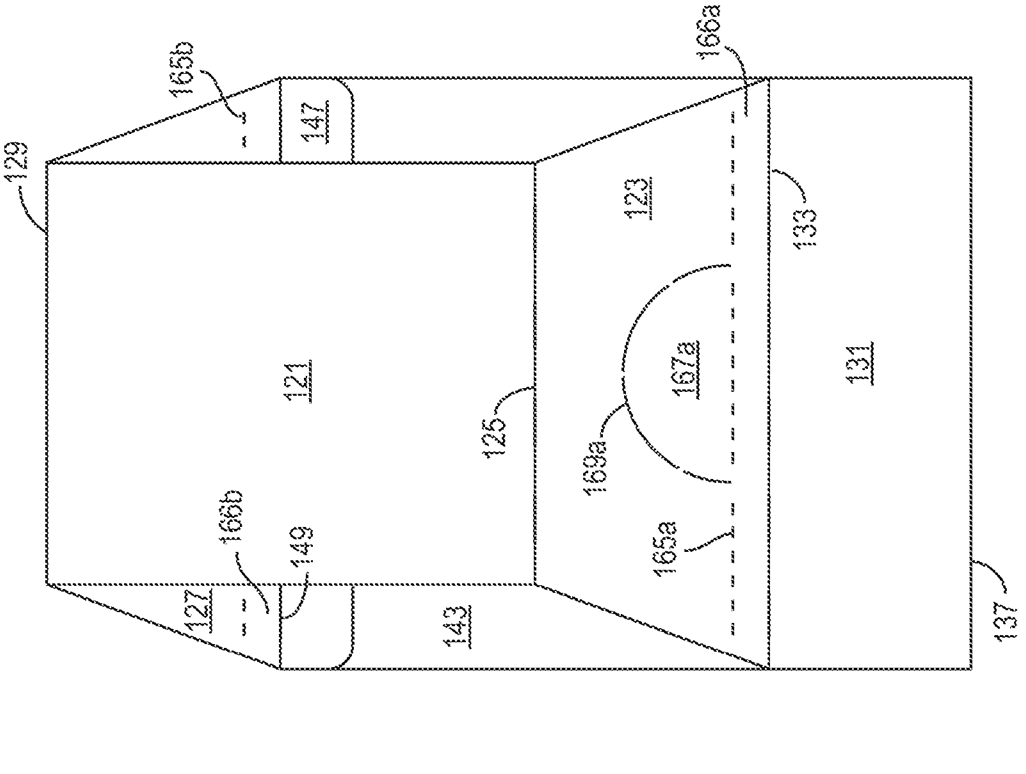

In embodiments, the sleeve 105 can be formed from the blank 103 by folding the panels 121, 123, 127, 131, 135, 139, 143 along the lateral fold lines 125, 129, 133, 141, 145, 149, 153 and gluing the first attachment flap 147 to the divider panel 143 (e.g., adjacent and/or proximate to the lateral fold line 145) and gluing the second attachment flap 151 to the first lower side panel 131 to form the open-ended sleeve 105. For example, the blank 103 can be folded along the lateral fold line 129 so that the second side panel 127 and the first attachment flap 147 are in an at least partially overlapping relationship with the top panel 121 and along the lateral fold line 145 so that the divider panel 143 and the second attachment flap 151 are in an at least partially overlapping relationship with the second lower side panel 139 and the bottom panel 135. Subsequently, the blank 103 can be folded along the lateral fold line 137 so that the first lower side panel 131 is in an at least partially overlapping relationship with the bottom panel 135 and the second attachment flap 151 and so that the first upper side panel 123, the top panel 121, and the first attachment flap 147 are in an at least partially overlapping relationship with the divider panel 143. In embodiments, glue can be applied to the blank 103 (e.g., along portions of the attachment flaps 147, 151 and/or along portions of the first lower side panel 131 and/or the divider panel 143) for gluing the attachment flaps 147, 151 to the respective divider panel 143 and first lower side panel 131 when they are respectively overlapped in forming the flattened construct (FIGS. 2A and 2B). As shown in FIGS. 2A and 2B, the sleeve 105 can be initially formed into and/or folded into a collapsed or folded configuration. Alternatively, the sleeve can be folded from an erected configuration described below to the collapsed configuration of FIGS. 2A and 2B, for example. The blank 103 could be otherwise formed into the construct without departing from the disclosure. For example, different portions of the blank could be glued together (e.g., the attachment flaps could be glued to different panels and/or could be foldably connected to different panels).

Figure 3B:
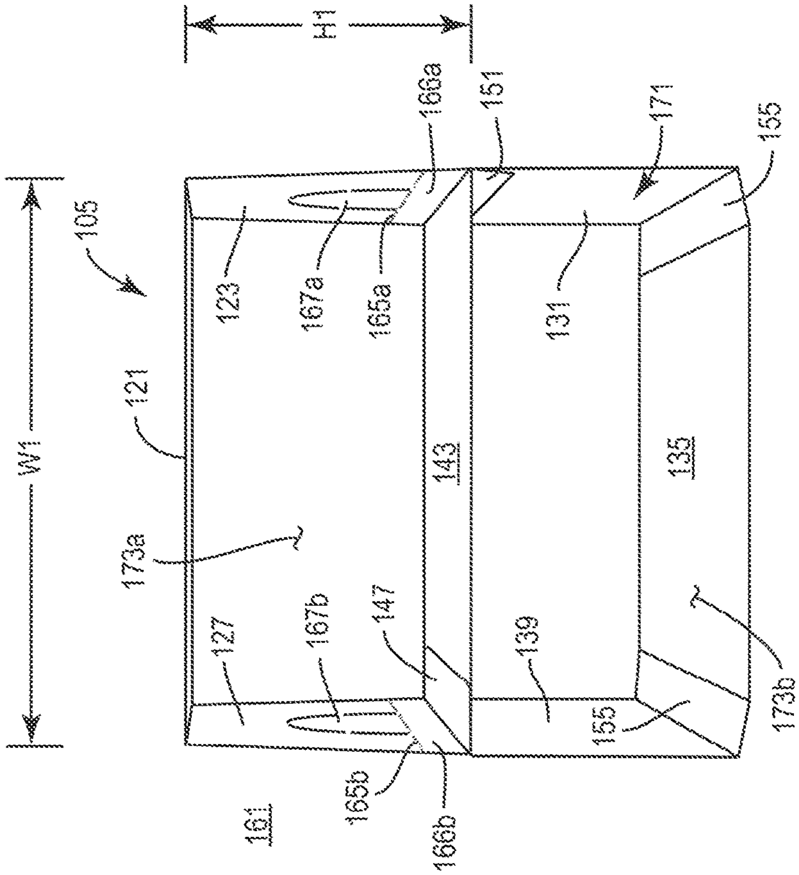
FIGS. 3A and 3B are perspective views of the erected construct sleeve formed from the blank of FIG. 1 and the flattened sleeve of FIGS. 2A and 2B with the sleeve in a first configuration according to exemplary embodiments of the disclosure.
Figure 3A:
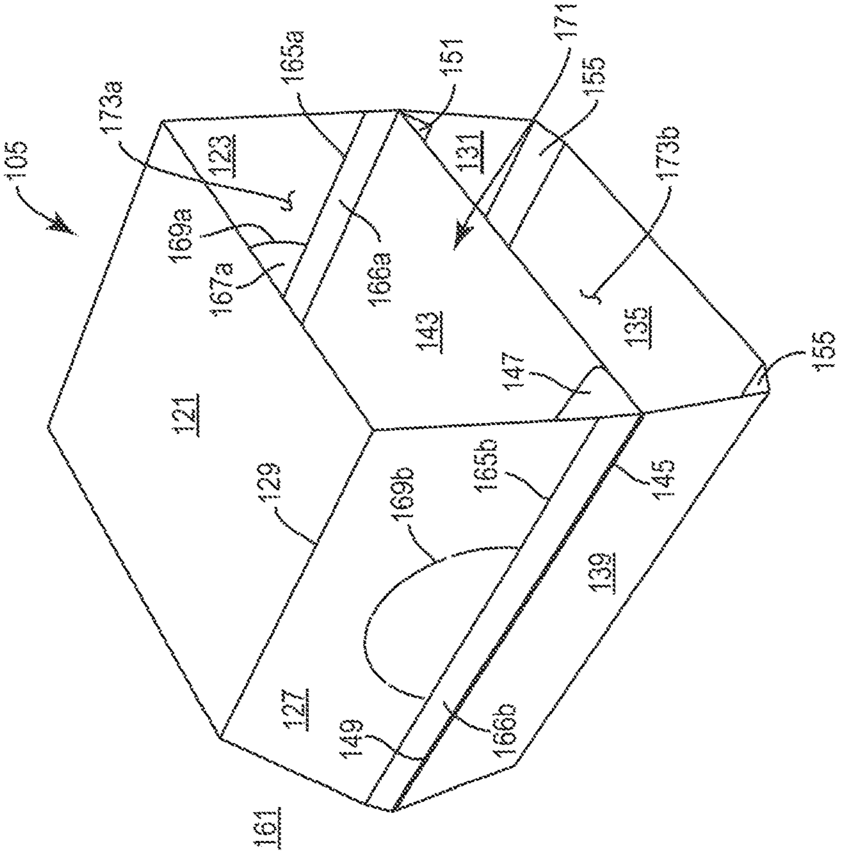

As shown in FIGS. 3A and 3B, the collapsed sleeve of FIGS. 2A and 2B can be folded along lateral fold lines 125, 129, 133, 141, 145, 149, 153 to erect the sleeve 105 into the first configuration 161, for example. In the illustrated embodiments, the panels 121, 123, 127, 131, 135, 139 can extend at least partially around an interior 171 of the sleeve 105, and the divider panel 143 can extend through the interior 171 to at least partially define two receiving spaces 173*a*, 173*b* of the sleeve 105 (FIGS. 3A and 3B). For example, the top panel 121, the upper side panels 123, 127 and the divider panel 143 can extend at least partially around the upper (e.g., first) receiving space 173*a* and the bottom panel 135, the lower side panels 131, 139, and the divider panel 143 can extend at least partially around the lower (e.g., second) receiving space 173*b*. In embodiments, the divider panel 143 and the first attachment flap 147 can cooperate to at least partially define a divider wall, the first upper side panel 123 and the first lower side panel 131 can cooperate to at least partially form a first sidewall, and the second upper side panel 127 and the second lower side panel 139 can cooperate to at least partially form a second sidewall (e.g., as shown in FIGS. 3A and 3B). The sleeve 105 could be otherwise formed without departing from the disclosure.

Figure 4A:
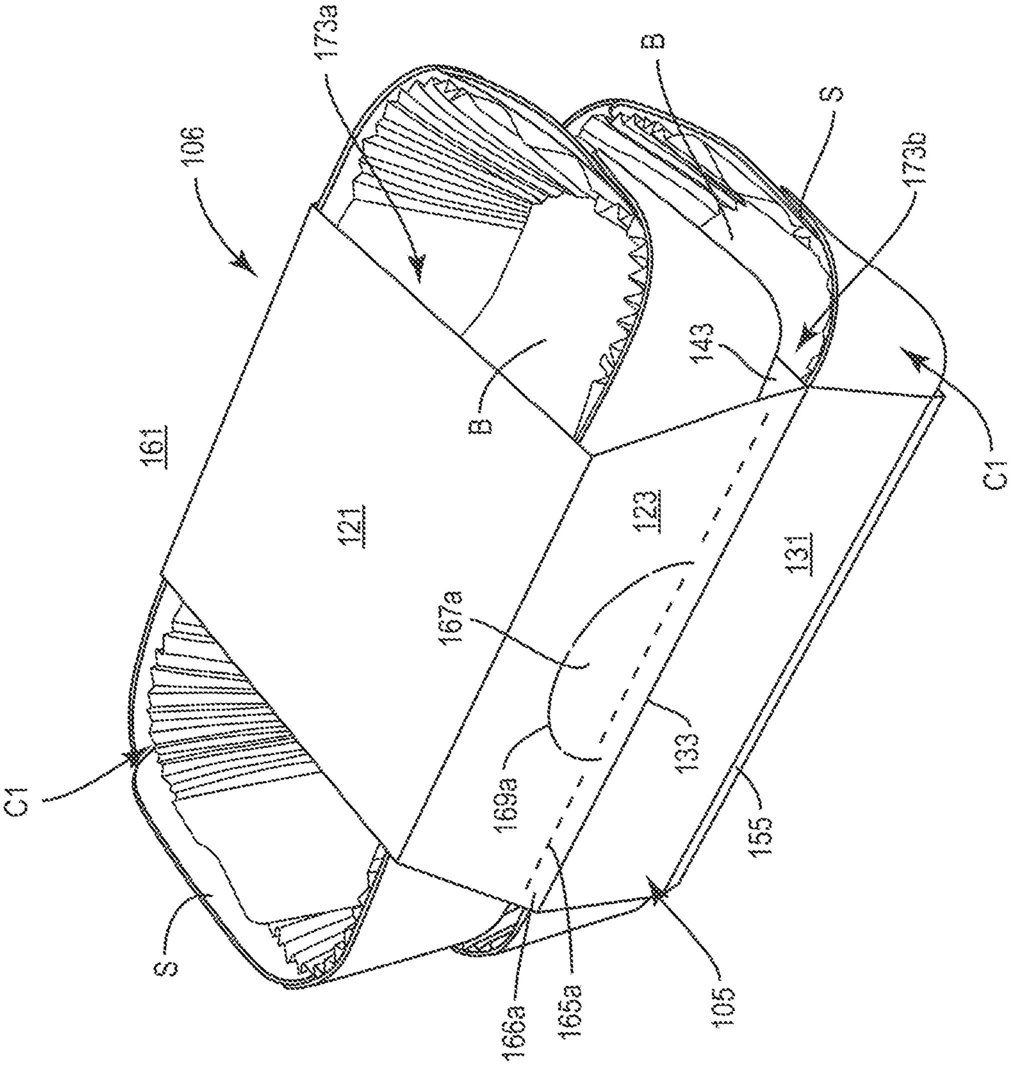
FIGS. 4A-4C are perspective views of a package including the sleeve of FIGS. 3A and 3B in the first configuration and two similar or identical product holding containers according to exemplary embodiments of the disclosure.
Figure 4B:
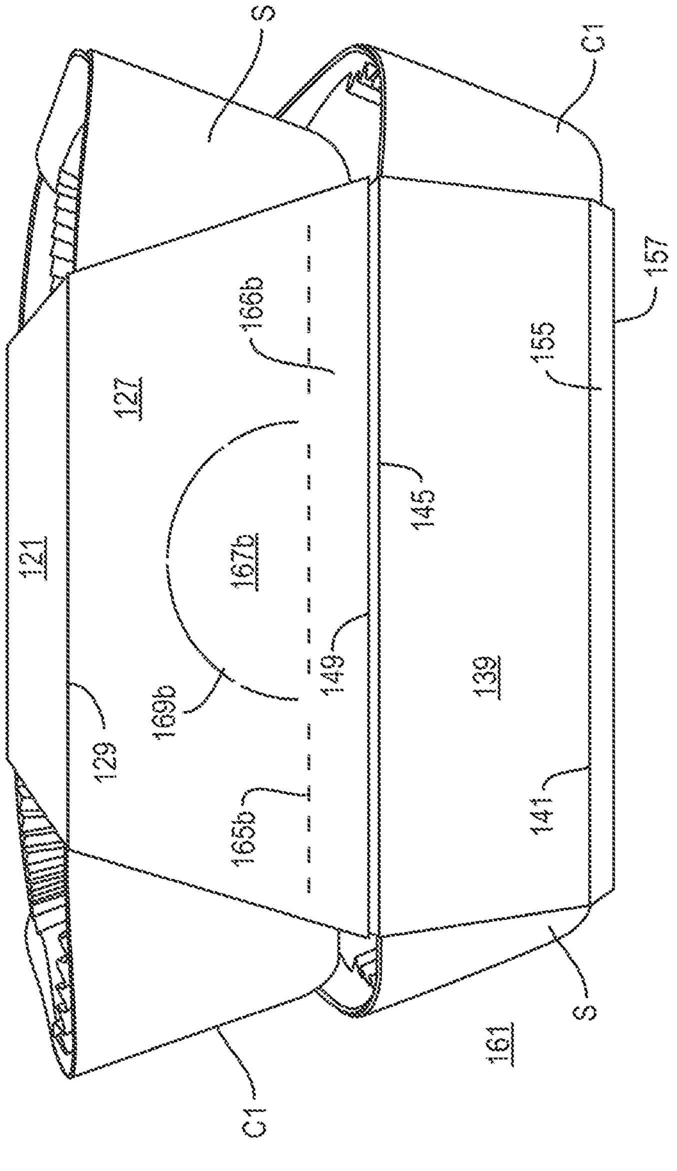
Figure 4C:
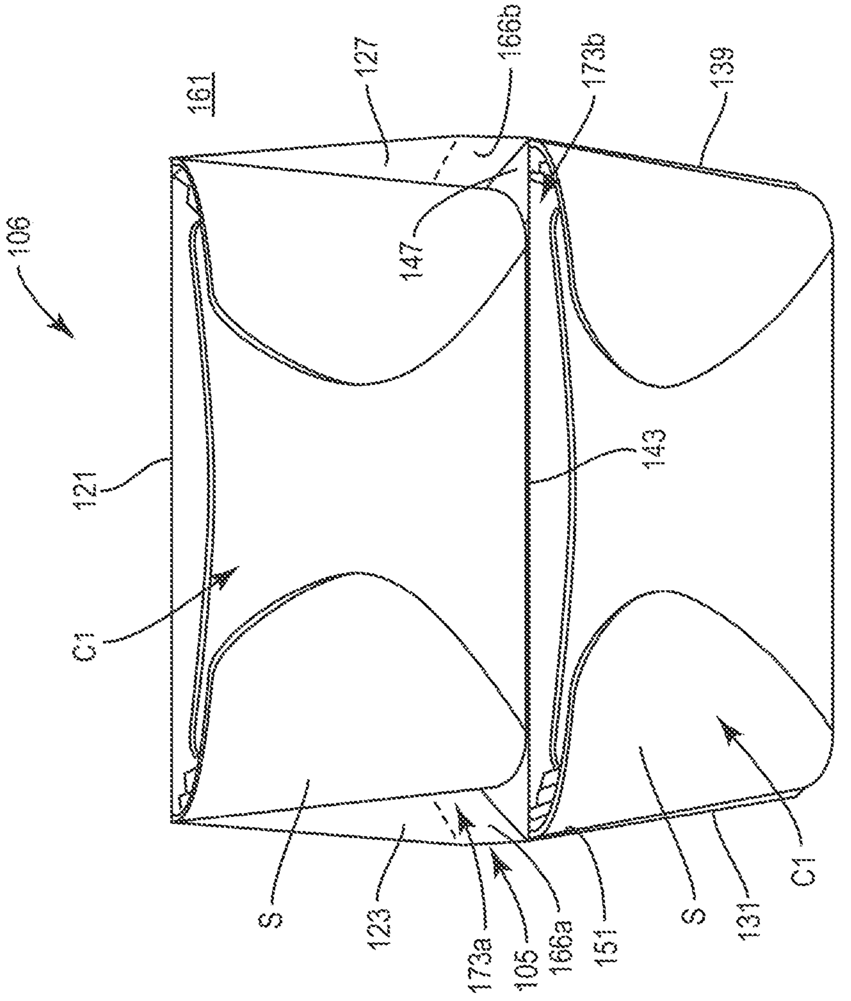
Figure 6:
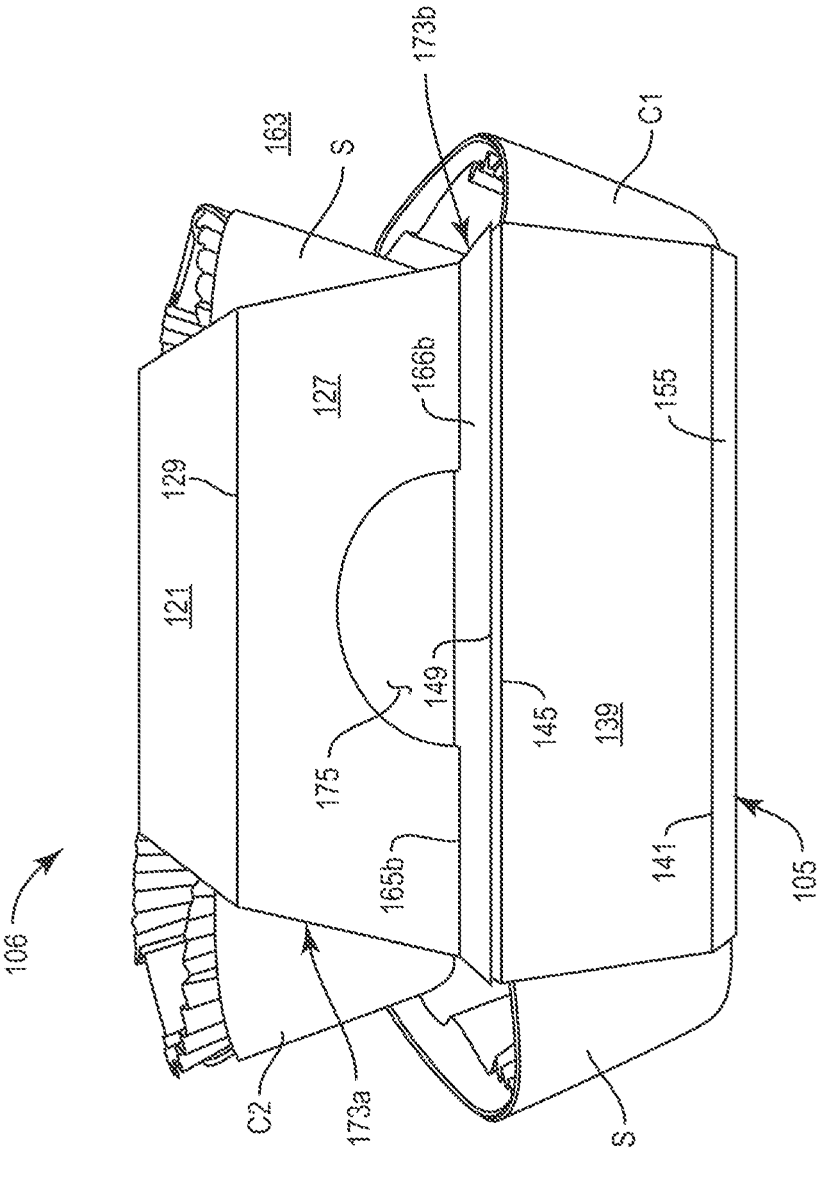
FIG. 6 is a perspective view of the package including the sleeve in the second configuration and two differently-sized product holding containers according to exemplary embodiments of the disclosure.

As shown in FIGS. 4A-4C, a container C1 or other suitable container can be inserted into the lower receiving space 173*b* (e.g., via an open end of the sleeve 105) and a second container C1 (FIGS. 4A-4C) or C2 (FIG. 6) can be inserted into the upper receiving space 173*a* (e.g., via an open end of the sleeve 105). Accordingly, the package 106 includes two containers C1 held in the sleeve 105 as shown in FIGS. 4A-4C, and the package 106 includes a container C1 and a container C2 held in the sleeve 105 as shown in FIG. 6. As shown in FIGS. 3A and 3B, the sleeve 105 is arranged in the first configuration 161 with the upper receiving space 173*a* ready to receive a container C1 (FIGS. 4A-4C). For example, as shown in FIG. 3B, the upper receiving space 173*a* can have a first width W1 extending between the upper side panels 123, 127 and a first height H1 extending between the divider panel 143 and the top panel 121. In embodiments, the first width W1 and the first height H1 can be selected with consideration for the width and height of the container C1 so that the container C1 fits snugly in the upper receiving space 173*a* in the first configuration 161. As shown in FIGS. 4A-4C, the container C1 can be received in the upper receiving space 173*a* in the first configuration 161, between the top panel 121 and the divider panel 143 and between the upper side panels 123, 127 with the adjustment features (e.g., the adjustment portions 166*a*, 166*b* and the tabs 167*a*, 167*b*) at least partially coplanar with a remainder of the respective upper side panels 123, 127.

Figure 5:
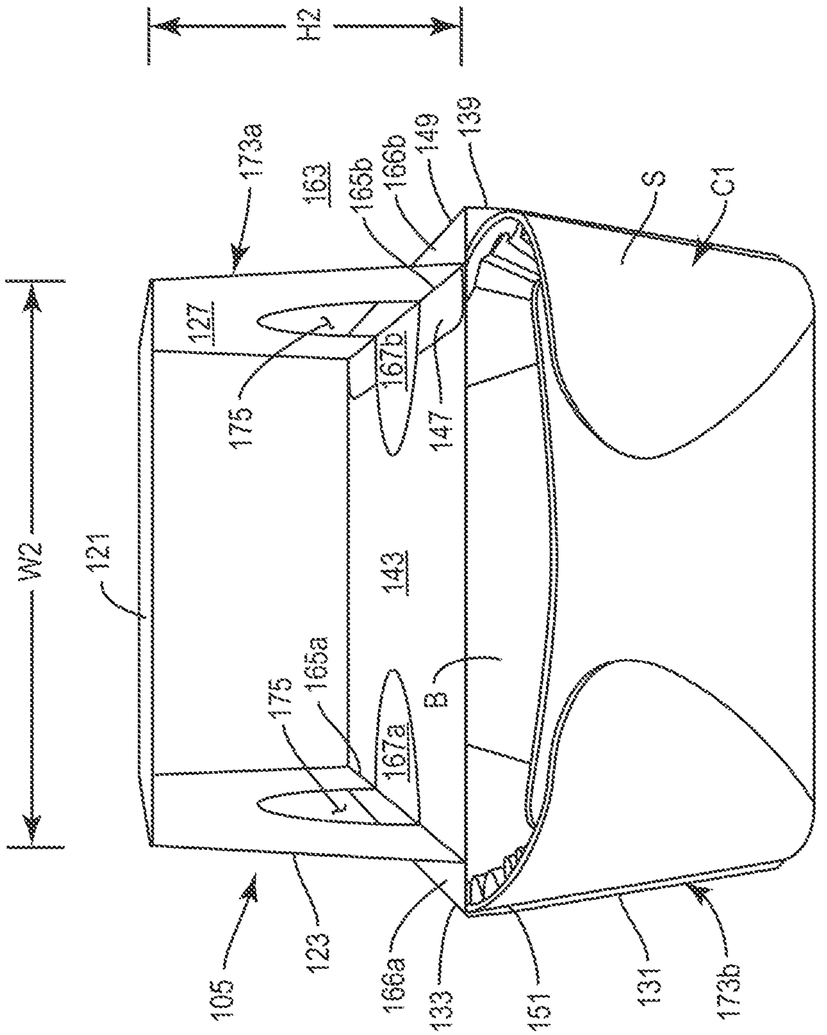
FIG. 5 is a perspective view showing the rearrangement of the sleeve of FIGS. 3A and 3B to a second configuration according to exemplary embodiments of the disclosure.

As shown in FIGS. 5 and 6, the sleeve can be moved to the second configuration 163 (e.g., before or after inserting a container into the lower receiving space 173*b*) so that the upper receiving space 173*a* is ready to receive the differently-sized (e.g., smaller) container C2. For example, the adjustment features can be actuated by folding the upper side panels 123, 127 along the intermediate fold lines 165*a*, 165*b* from a first position (FIGS. 3A and 3B) to a second position (FIGS. 5 and 6). In embodiments, the adjustment portions 166*a*, 166*b* and the tabs 167*a*, 167*b* can be at least partially planar with remainders of the respective upper side panels 123, 127 when the upper side panels are in the first position. As the upper side panels 123, 127 are moved from the first position to the second position, the tabs 167*a*, 167*b* can break away from the respective upper side panels 123, 127 along the respective tear lines 169*a*, 169*b* and the adjustment portions 166*a*, 166*b* and the tabs 167*a*, 167*b* can extend in a direction that is nonparallel with (e.g., at least partially perpendicular to) the remainders of the upper side panels 123, 127. As shown in FIGS. 5 and 6, openings 175 are formed in the upper side panels 123, 127 when the tabs 167*a*, 167*b* are folded away from the upper side panels 123, 127. The adjustment portions 166*a*, 166*b* of the respective upper side panels 123, 127 also can be folded along the lateral fold lines 133, 149 so that the adjustment portions 166*a*, 166*b* and the tabs 167*a*, 167*b* are folded downwardly toward the divider wall. In embodiments, the adjustment portions 166*a*, 166*b* and/or the tabs 167*a*, 167*b* can be folded into face-to-face contact with the divider panel 143 and/or with the first attachment flap 147.

In embodiments, the actuation of the adjustment features to move the upper side panels 123, 127 from the first position to the second position can shorten the width of the upper receiving space 173*a* (e.g., bringing the upper side panels 123, 127 closer together) for accommodating the smaller container C2. In addition or alternatively, moving the upper side panels 123, 127 to the second position can reduce the height of the upper receiving space 173*a* (e.g., to shorten the spacing between the top panel 121 and the divider panel 143). For example, as shown in FIG. 5, the upper receiving space 173*a* can have a second width W2 that is shorter that the first width W1 and a second height H2 that is shorter than the first height H1. In embodiments, the second width W2 and the second height H2 can be selected with consideration for the width and height of the container C2 so that the container C2 fits snugly in the upper receiving space 173*a* in the second configuration 163. The sleeve 105 could be otherwise moved between the configurations 161, 163 without departing from the disclosure. For example, the sleeve 105 could be erected (e.g., from the flattened configuration of FIGS. 2A and 2B) into the second configuration 163 and/or the sleeve 105 could be moved from the second configuration 163 to the first configuration 161.

As shown in FIG. 6, the second container C2 can be inserted into the upper receiving space 173*a*, which has been moved to the second configuration 163. In the illustrated embodiments, the tabs 167*a*, 167*b* can extend between the divider wall and the bottom B of the container C2, which can help retain the shape of the sleeve 105 and/or can help retain the sleeve 105 in the second configuration 163 (e.g., can help resist outward folding of the upper side panels 123, 127). For example, the tabs 167*a*, 167*b* can be held down against the divider wall by the weight of the container C2 and its contents and/or a snug fitting of the container C2 between the tabs 167*a*, 167*b* and the top panel 121.

In the illustrated embodiments, the sleeve 105 can selectively hold two of the same containers C1 or two different containers C1, C2 by folding the adjustment features without needing to rearrange the panels of the construct/blank and without changing how the panels are glued together. Accordingly, the exemplary constructs of the present disclosure allow a user to obtain a plurality of the blanks 103 (e.g., identical blanks) with the flexibility of being able to selectively configure at least a portion (e.g., the upper receiving spaces 173*a*) of the sleeves 105 formed from the blanks 103 for holding containers having different selected sizes (e.g., containers C1, C2 or other suitable articles). In exemplary embodiments, this flexibility can simplify inventory management (e.g., fewer die lines to track), reduce storage requirements, and/or make packaging the containers C1, C2 easier.

In general, the blanks of the present disclosure may be constructed from paperboard having a caliper so that it is heavier and more rigid than ordinary paper. The blank can also be constructed of other materials, such as cardboard, or any other material having properties suitable for enabling the carton to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding there along. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carton embodiments. The term "glue" is intended to encompass all manner of adhesives commonly used to secure carton panels in place.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A construct for at least partially receiving one or more product holding containers, the construct comprising:

a plurality of panels extending at least partially around an interior of the construct, the plurality of panels having at least a first configuration for at least partially receiving a first container in the interior and a second configuration for at least partially receiving a second container in the interior, wherein the first container has a first size and the second container has a second size that is different than the first size; and an adjustment section in at least a panel of the plurality of panels being at least partially coplanar with a remainder of the panel in the first configuration and being non-coplanar with the remainder of the panel in the second configuration;

a tab extending from the adjustment section in the first configuration and the second configuration.

2. The construct of claim 1, wherein the tab is separable from the panel along a line of weakening in the first configuration and extends away from the panel in the second configuration.

3. The construct of claim 2, wherein the tab is for extending under the second container in the interior of the construct, and wherein the second container is smaller than the first container.

4. The construct of claim 1, wherein the adjustment section of the panel is foldably connected to the remainder of the panel.

5. The construct of claim 4, wherein the panel is a side panel, the plurality of panels further comprises a divider panel and a top panel opposite to the divider panel, and at least a portion of the side panel extends from the divider panel to the top panel, and wherein the adjustment section extends away from the divider panel in the first configuration and extends along at least a portion of the divider panel in the second configuration.

6. The construct of claim 5, wherein the top panel is spaced apart from the divider panel by a first height in the first configuration, the top panel is spaced apart from the divider panel by a second height in the second configuration, and the second height is less than the first height.

7. The construct of claim 1, wherein the panel is a first panel, the adjustment section is a first adjustment section, and the construct comprises a second adjustment section in a second panel of the plurality of panels, wherein the second adjustment section is at least partially coplanar with a remainder of the second panel in the first configuration and is non-coplanar with the remainder of the second panel in the second configuration.

8. The construct of claim 7, wherein the first panel and the second panel are spaced apart by a first width in the first configuration and by a second width in the second configuration, and wherein the second width is less than the first width.

9. The construct of claim 7, wherein the first adjustment section and the second adjustment section are foldably connected to the remainder of the respective first panel and second panel.

10. The construct of claim 9, wherein the tab is a first tab extending from the first adjustment section and the construct further comprises a second tab extending from the second adjustment section.

11. The construct of claim 1, wherein the interior of the construct comprises a first receiving space and a second receiving space, the panel extending along at least a portion of the first receiving space, wherein the first receiving space is for at least partially receiving the first container in the first configuration and is for at least partially receiving the second container in the second configuration, and wherein the second receiving space is for receiving a further container that is similar or identical to the first container.

12. The construct of claim 11, wherein the plurality of panels comprises a divider panel extending in the interior of the construct to at least partially define the first receiving space and the second receiving space, the panel is an upper side panel extending upwardly from the divider panel, and the plurality of panels further comprises a lower side panel extending downwardly from the divider panel along the second receiving space.

13. The construct of claim 12, wherein the plurality of panels comprises a top panel extending along at least a portion of the first receiving space and a bottom panel extending along at least a portion of the second receiving space, the upper side panel extending at least partially from the divider panel to the top panel and the lower side panel extending at least partially from the divider panel to the bottom panel.

14. A package comprising a construct at least partially receiving one or more product holding containers, the construct comprising:

- a plurality of panels extending at least partially around an interior of the construct; and
- an adjustment section in at least a panel of the plurality of panels;
- wherein the plurality of panels has at least a first configuration in which the adjustment section is at least partially coplanar with a remainder of the panel and a second configuration in which the adjustment section is non-coplanar with the remainder of the panel, wherein a tab extends from the adjustment section in the first configuration and the second configuration and wherein a first container is at least partially received in the interior of the construct when the plurality of panels is in the first configuration and a second container is at least partially received in the interior of the construct when the plurality of panels is in the second configuration, and wherein the first container has a first size and the second container has a second size that is different than the first size.

15. The package of claim 14, wherein the tab is separable from the panel along a line of weakening in the first configuration and extends away from the panel in the second configuration.

16. The package of claim 15, wherein the tab extends under the second container in the interior of the construct in the second configuration, and wherein the second container is smaller than the first container.

17. The package of claim 14, wherein the panel is a side panel, the plurality of panels further comprises a divider panel and a top panel opposite to the divider panel, and at least a portion of the side panel extends from the divider panel to the top panel, and wherein the adjustment section extends away from the divider panel in the first configuration and extends along at least a portion of the divider panel in the second configuration.

18. The package of claim 17, wherein the top panel is spaced apart from the divider panel by a first height in the first configuration, the top panel is spaced apart from the divider panel by a second height in the second configuration, and the second height is less than the first height.

19. The package of claim 14, wherein the panel is a first panel, the adjustment section is a first adjustment section, and the construct comprises a second adjustment section in a second panel of the plurality of panels, wherein the second adjustment section is at least partially coplanar with a remainder of the second panel in the first configuration and is non-coplanar with the remainder of the second panel in the second configuration, and wherein the first panel and the second panel are spaced apart by a first width in the first configuration and by a second width in the second configuration, and wherein the second width is less than the first width.

20. The package of claim 14, wherein the interior of the construct comprises a first receiving space and a second receiving space, the panel extending along at least a portion of the first receiving space, wherein the first container is at least partially received in the first receiving space in the first configuration and the second container is at least partially received in the first receiving space in the second configuration, and wherein a further container that is similar or identical to the first container is at least partially received in the second receiving space.

21. A blank for forming a construct for at least partially receiving one or more product holding containers, the blank comprising:

a plurality of panels, wherein the plurality of panels has at least a first configuration for at least partially receiving a first container in an interior of the construct formed from the blank and a second configuration for receiving a second container in the interior of the construct formed from the blank, wherein the first container has a first size and the second container has a second size that is different than the first size; and an adjustment section in at least a panel of the plurality of panels, wherein, when the construct is formed from the blank, the adjustment feature is for being at least partially coplanar with a remainder of the panel in the first configuration and is for being non-coplanar with the remainder of the panel in the second configuration;

a tab extending from the adjustment section in the first configuration and the second configuration.

22. The blank of claim 21, wherein the tab is separable from the panel along a line of weakening, and wherein the tab is for being positioned to extend away from the panel in the second configuration when the construct is formed from the blank.

23. The blank of claim 21, wherein the adjustment section of the panel is foldably connected to the remainder of the panel.

24. The blank of claim 21, wherein the panel is a first panel, the adjustment section is a first adjustment section, and the construct comprises a second adjustment section in a second panel of the plurality of panels, wherein, when the construct is formed from the blank, the second adjustment section is for being at least partially coplanar with a remainder of the second panel in the first configuration and is for being non-coplanar with the remainder of the second panel in the second configuration.

25. The blank of claim 24, wherein the first adjustment section and the second adjustment section are foldably connected to the remainder of the respective first panel and second panel.

26. The blank of claim 25, wherein the tab is a first tab extending from the first adjustment section and the blank further comprises a second tab extending from the second adjustment section.

27. The blank of claim 24, wherein the plurality of panels comprises a top panel foldably connected to each of the first panel and the second panel, and wherein each of the first adjustment section and the second adjustment section is spaced apart from the top panel.

28. The blank of claim 21, wherein the panel is an upper side panel for extending along at least a portion of a first receiving space when the construct is formed from the blank, and wherein the plurality of panels comprises a lower side panel for extending along at least a portion of a second receiving space when the construct is formed from the blank.

29. The blank of claim 28, wherein the upper side panel is foldably connected to a top panel and the lower side panel is foldably connected to a bottom panel, and wherein the top panel and the bottom panel are for extending along at least a portion of the respective first receiving space and second receiving space when the construct is formed from the blank.

30. The blank of claim 29, wherein the plurality of panels further comprises a divider panel foldably connected to the lower side panel, the divider panel being for extending along at least a portion of each of the first receiving space and the second receiving space when the construct is formed from the blank.

31. The blank of claim 28, wherein the adjustment section is foldably connected to the remainder of the upper side panel and is foldably connected to the lower side panel.

32. A method of forming a construct, the method comprising:

obtaining a blank comprising a plurality of panels and an adjustment section in at least a panel of the plurality of panels; and forming the construct by folding the plurality of panels to extend at least partially around an interior of the construct;

wherein the plurality of panels has at least a first configuration for at least partially receiving a first container in the interior and a second configuration for at least partially receiving a second container in the interior, wherein the first container has a first size and the second container has a second size that is different than the first size, and wherein the adjustment section is at least partially coplanar with a remainder of the panel in the first configuration and is non-coplanar with the remainder of the panel in the second configuration and wherein a tab of the construct extends from the adjustment section in the first configuration and the second configuration.

33. The method of claim 32, wherein the tab is separable from the panel along a line of weakening, and wherein the method further comprises arranging the plurality of panels in the second configuration comprising separating the tab from the panel and positioning the tab to extend away from the panel.

34. The method of claim 32, wherein the adjustment section of the panel is foldably connected to the remainder of the panel.

35. The method of claim 32, wherein the panel is an upper side panel, the plurality of panels further comprises a lower side panel, and the forming the construct further comprises forming at least a first receiving space and a second receiving space, wherein the first receiving space is for receiving the first container in the first configuration and is for receiving the second container in the second configuration, and the second receiving space is for receiving a further container that is similar or identical to the first container, and wherein the upper side panel extends along the first receiving space and the lower side panel extends along the second receiving space.

36. The method of claim 35, wherein the upper side panel is foldably connected to a top panel and the lower side panel is foldably connected to a bottom panel, and wherein the forming the construct further comprises positioning the top panel and the bottom panel along at least a portion of the respective first receiving space and second receiving space.

37. The method of claim 35, wherein the plurality of panels further comprises a divider panel foldably connected to the lower side panel, and wherein the forming the construct further comprises positioning the divider panel along at least a portion of each of the first receiving space and the second receiving space.

* * * * *